United States Patent
Yoshikawa (10) Patent No.: US 7,357,117 B2
(45) Date of Patent: Apr. 15, 2008

(54) STRUCTURED COMBUSTION CHAMBER FOR USE IN ENGINE

(75) Inventor: Satoshi Yoshikawa, Otsu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/430,890

(22) Filed: May 10, 2006

(65) Prior Publication Data

US 2006/0266328 A1 Nov. 30, 2006

(30) Foreign Application Priority Data

May 27, 2005 (JP) ............................. 2005-156184

(51) Int. Cl.
*F02B 31/00* (2006.01)
*F01L 1/34* (2006.01)
*F02N 3/00* (2006.01)

(52) U.S. Cl. ................ 123/308; 123/188.14; 123/90.15

(58) Field of Classification Search ................ 123/306, 123/308, 262, 298, 432, 90.15, 90.1, 90.25, 123/90.23, 188.14, 188.2, 188.8, 190.2

See application file for complete search history.

(56) References Cited

U.S. PATENT DOCUMENTS

| | | | | |
|---|---|---|---|---|
| 3,927,655 A | * | 12/1975 | Goto et al. ................... | 123/306 |
| 5,165,374 A | * | 11/1992 | Chapman et al. ........... | 123/308 |
| 5,255,649 A | * | 10/1993 | Isaka ........................... | 123/308 |
| 5,479,889 A | * | 1/1996 | Sato et al. ................... | 123/308 |
| 5,634,444 A | * | 6/1997 | Matsuki et al. ............. | 123/306 |
| 5,913,554 A | * | 6/1999 | Oda et al. ................. | 29/888.41 |
| 6,138,639 A | * | 10/2000 | Hiraya et al. ............... | 123/295 |
| 6,431,140 B1 | * | 8/2002 | Nishimura et al. .......... | 123/306 |
| 6,634,333 B2 | * | 10/2003 | Fujieda et al. .............. | 123/308 |
| 6,877,478 B2 | * | 4/2005 | Kim et al. ................... | 123/306 |
| 6,971,344 B2 | * | 12/2005 | HIrano ....................... | 123/79 C |
| 6,971,379 B2 | * | 12/2005 | Sakai et al. ................. | 123/661 |

FOREIGN PATENT DOCUMENTS

JP 2004-293483 A 10/2004

* cited by examiner

*Primary Examiner*—Willis R. Wolfe
*Assistant Examiner*—Johnny H. Hoang
(74) *Attorney, Agent, or Firm*—Birch, Stewart, Kolasch & Birch, LLP (57) ABSTRACT

A structured combustion chamber for an engine has a cylinder head with an intake hole portion communicating between an intake port and a combustion chamber and an exhaust hole portion which makes a communication between an exhaust port and the combustion chamber, an intake valve for opening and closing the intake hole portion, and a continuous variable valve lift mechanism for lifting the intake valve in a stepless fashion, a flow promoting device is provided to promote a motion of an air current in the combustion chamber when a quantity of lift of the intake valve driven by the continuous variable valve lift mechanism is small and further to suppress a decrease in flow rate of an intake air coming through the intake hole portion into the combustion chamber when the quantity of lift of the intake valve driven by the continuous variable valve lift mechanism reaches a maximum.

17 Claims, 10 Drawing Sheets

STRUCTURED COMBUSTION CHAMBER FOR USE IN ENGINE

BACKGROUND OF THE INVENTION

1. Field of the Invention

The present invention relates to a structured combustion chamber for use in an engine.

2. Description of the Related Art

So far, in an engine mounted on an automobile, there has been known a mechanism which can vary a timing of lift (that is, phase based on rotation of a crankshaft) or quantity of lift of an intake valve or exhaust valve. This mechanism, which has already been put to practical use, is referred to as a valve operating mechanism or variable valve lift mechanism and is designed to improve the fuel consumption in a low rotation region while securing the engine output in a high rotation region.

As a document describing one example of a technology related to this valve operating mechanism, there is a technique disclosed in Japanese Patent Laid-Open No. 2004-293483 (patent document 1). This patent document 1 discloses a technique capable of varying the quantity of lift of an intake valve in two steps.

Meanwhile, FIG. 5 of this patent document 1 shows the formation of a wall portion, designated at reference numeral 45a, thereby producing a tumble flow in a combustion chamber when an intake valve is driven by a low lift cam.

In addition, this patent document 1 makes a disclosure to the effect of setting a height of the wall portion for the purpose of enhancing the suction flow in the case of the valve operation by the low lift cam. However, the formation of the wall portion based on such a consideration counteracts the suction flow into the combustion chamber, which additionally creates a problem of holding down the torque outputted from the engine.

On the other hand, in recent years, there has been developed a mechanism (so-called continuous variable valve lift mechanism) capable of continuously changing the quantity of lift of an intake valve or exhaust valve and being put into practice.

The employment of this continuous variable valve lift mechanism can change a quantity of lift of an intake valve continuously so as to freely vary the quantity of suction into the engine and, in a case in which the lift quantity of the intake valve is designed to vary according to the load needed, the reduction of fuel consumption becomes feasible by finely adjusting the quantity of suction.

Furthermore, in the continuous variable valve lift mechanism, the realization of delicate suction quantity control requires securing the performance in a high valve lift condition while enhancing the suction flow in a low valve lift condition.

Accordingly, in a case in which a wall portion is formed for the purpose of enhancing the suction flow in the case of the valve driving by the low lift cam as written in the patent document 1, no consideration is given to the engine performance in a high valve lift condition, which leads to considerably hindering the suction flow to the combustion chamber.

In particular, in the continuous variable valve lift mechanism, the maximum quantity of lift of the intake valve denotes the maximum acceleration pedal depressing quantity and signifies the requirement for the engine to produce the maximum torque output.

Therefore, in such a continuous variable valve lift mechanism, the formation of a wall portion disclosed in the patent document 1 extremely degrades the full-opening performance of the engine.

SUMMARY OF THE INVENTION

The present invention has been developed in consideration of these problems, and it is therefore an object of the invention to provide a structured combustion chamber of an engine capable of improving the combustion stability, exhaust gas performance and fuel consumption of an engine and of suppressing a decrease in engine output, particularly, the degradation of the full-opening performance of the engine.

For this purpose, in accordance with the present invention, there is provided a structured combustion chamber for use in an engine, comprising a cylinder head including an intake hole portion which makes a communication between an intake port and a combustion chamber and an exhaust hole portion which makes a communication between an exhaust port and the combustion chamber, an intake valve for opening and closing the intake hole portion, a continuous variable valve lift mechanism for lifting the intake valve in a stepless fashion, and a flow promoting device made to promote a motion of an air current in the combustion chamber when a quantity of lift of the intake valve driven by the continuous variable valve lift mechanism is small and made to suppress a decrease in flow rate of an intake air coming through the intake hole portion into the combustion chamber when the quantity of lift of the intake valve driven by the continuous variable valve lift mechanism reaches a maximum.

This structure can contribute to the promotion of suction flow in a combustion chamber, thereby improving the combustion stability, exhaust gas performance and fuel consumption, even in the case of a small lift quantity of an intake valve and a small suction quantity into a combustion chamber.

In addition, in a case in which the lift quantity of the intake valve is at a maximum, that is, even when a demand exists for the engine to produce the maximum output torque, the decrease in quantity of suction flow into the combustion chamber is suppressible to the utmost, thus suppressing the decrease in engine output.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
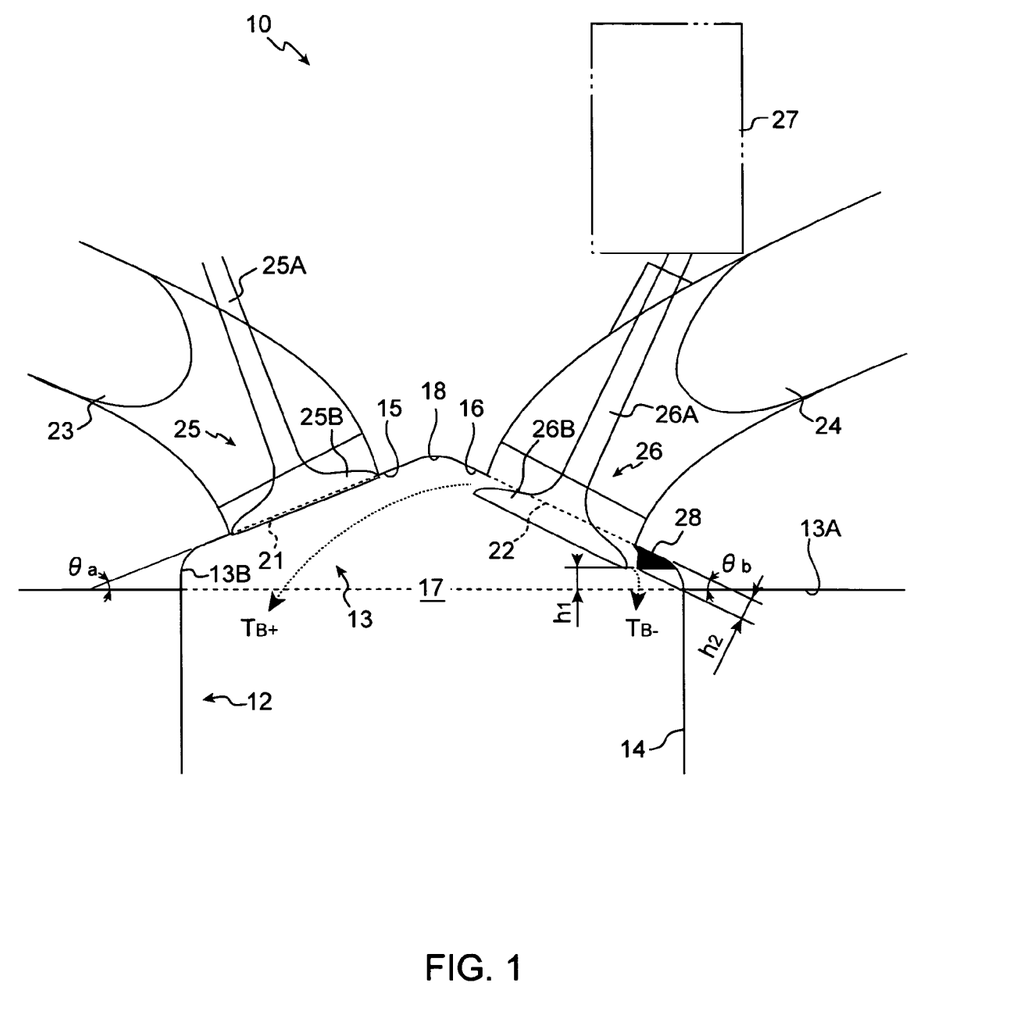
FIG. 1 is a cross-sectional view illustratively showing a structure of a combustion chamber of an engine according to a first embodiment of the present invention.
Figure 3:
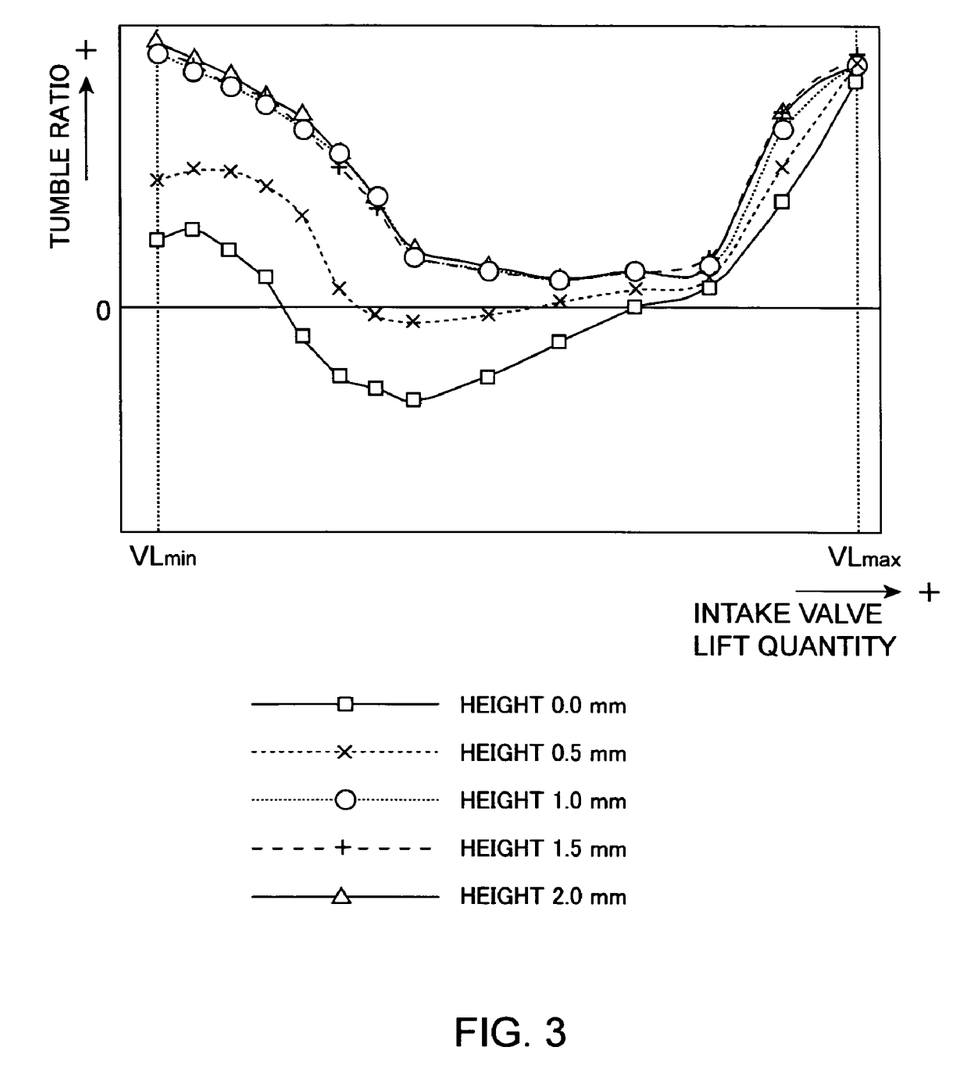
FIG. 3 is an graphic diagram illustratively showing the relationship between the degree of air flow and a quantity of lift of an intake valve in a structure of a combustion chamber of an engine according to the first embodiment of the present invention.
Figure 4:
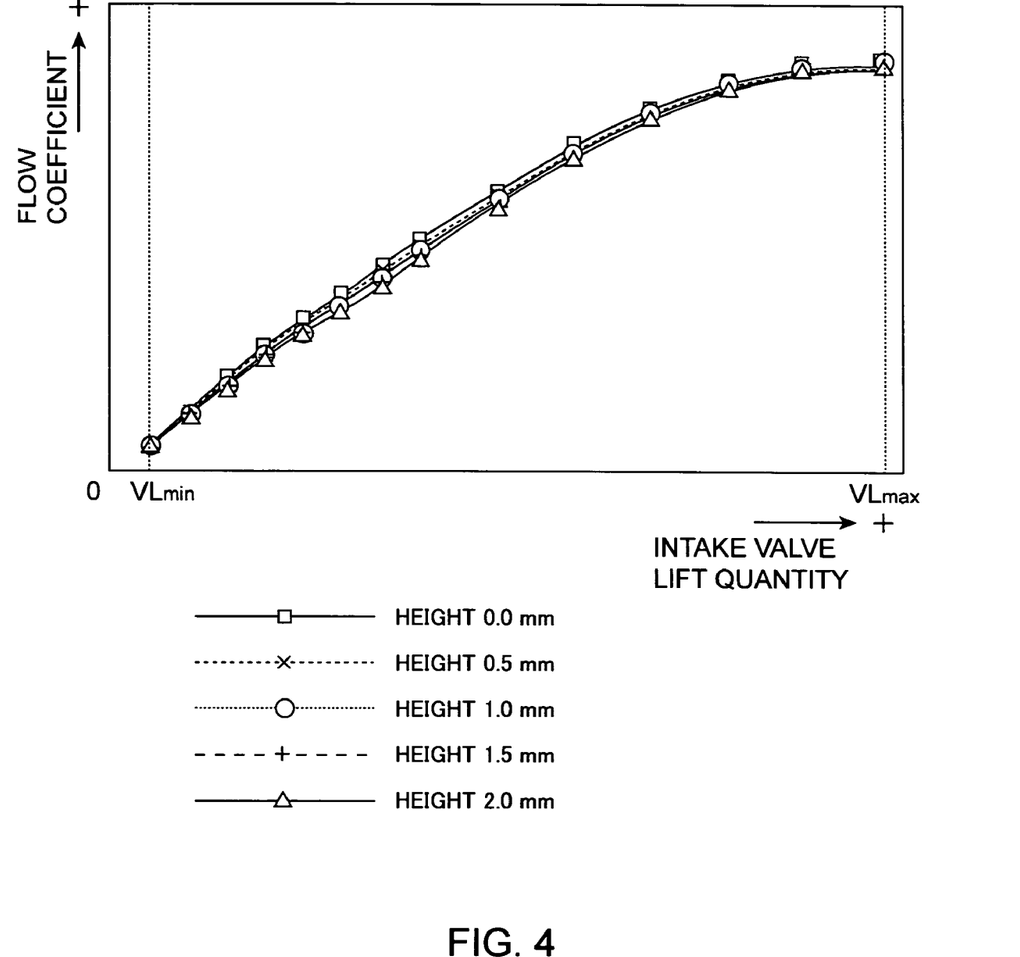
FIG. 4 is a graphic diagram illustratively showing the relationship between a suction flow and a quantity of lift of an intake valve in a structure of a combustion chamber of an engine according to the first embodiment of the present invention.

With reference to the drawings, a description will be given hereinbelow of a structure of a combustion chamber of an engine according to a first embodiment of the present invention. FIG. 1 is a cross-sectional view illustratively showing a structure of a combustion chamber thereof, FIG. 2 is a plan view illustratively showing a cylinder head when viewed from a cylinder block side, FIG. 3 is an graphic diagram illustratively showing the relationship between the degree of air flow and a quantity of lift of an intake valve in the combustion chamber, and FIG. 4 is a graphic diagram illustratively showing the relationship between a suction flow into the combustion chamber and a quantity of lift of an intake valve.

Figure 2:
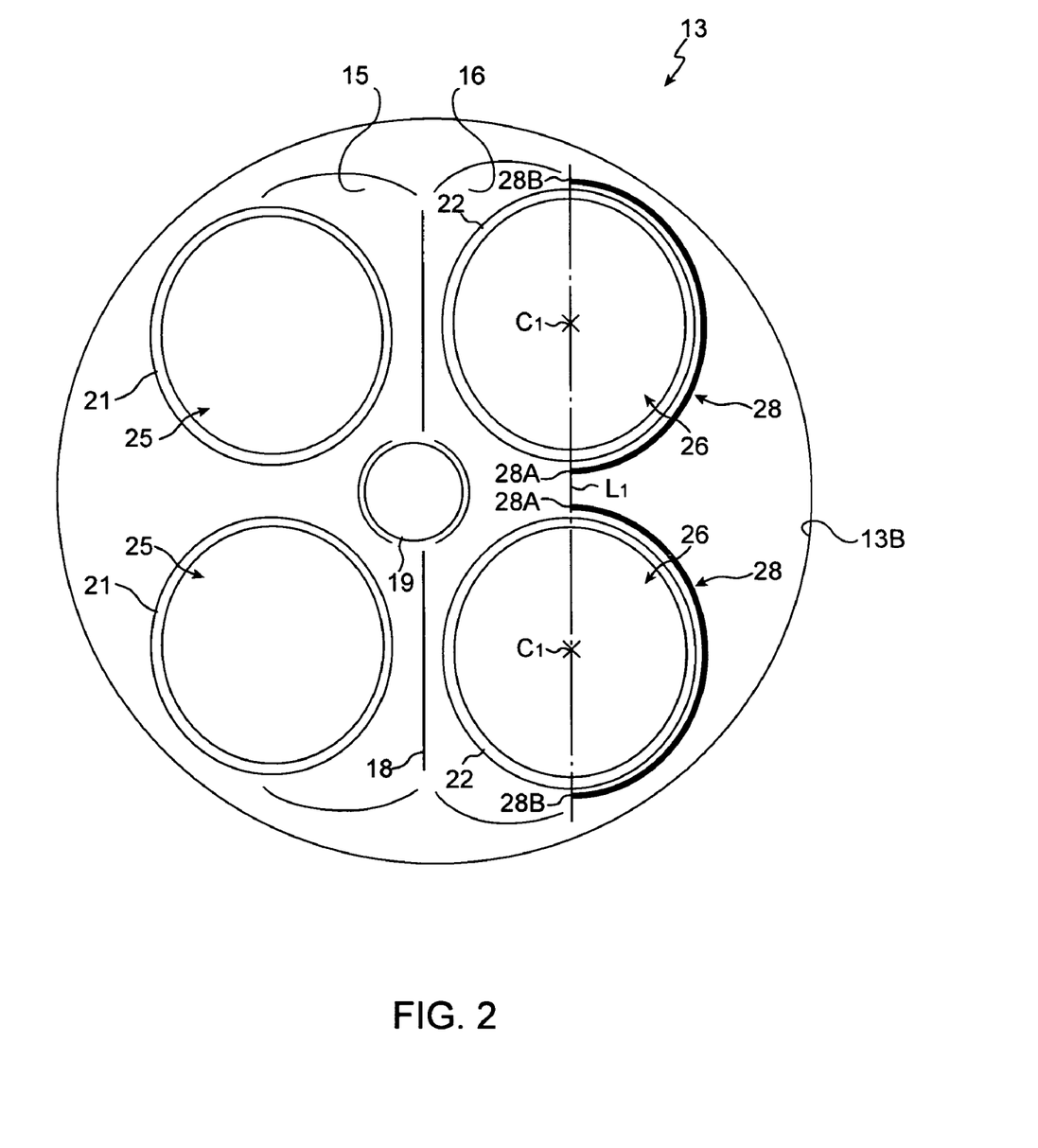
FIG. 2 is a plan view illustratively showing a structure of a combustion chamber of an engine according to the first embodiment of the present invention when a cylinder head is viewed from a cylinder block side.

As shown in FIGS. 1 and 2, an engine 10 is mainly made up of a cylinder block 12 and a cylinder head 13. A cylinder is formed in the cylinder block 12, and an exhaust side slope (first inclination surface) 15 and an intake side slope (second inclination surface) 16 are formed in the cylinder head 13. Moreover, a side wall portion (inner circumference portion of a combustion chamber) 13B stands upwardly from lower edges of these exhaust side slop 15 and intake side slope 16 to a lower end plane 13A of the cylinder head 71.

In addition, a combustion chamber 17 is defined as a space surrounded by the cylinder 14, the exhaust side slope 15, the intake side slope 16, the side wall portion 13B and a piston (not shown).

Still additionally, the exhaust side slope 15 and the intake side slope 16 in the cylinder head 13 are made to extend, in a state inclined, from an apex 18 forming the highest portion of the combustion chamber 17 toward both lower sides, with an upper wall of the combustion chamber 17 being shaped into a pentroof configuration. The inclination angle of the exhaust side slope 15 is set at $\theta_a$ with respect to the lower end plane 13A of the cylinder head 13, and the inclination angle of the intake side slope 16 is set at $\theta_b$ with respect to the cylinder head lower end plane 13A.

Furthermore, as FIG. 2 shows, two exhaust hole portions 21 and 21 are made in the exhaust side slope 15 of the cylinder head 13 while two intake hole portions 22 and 22 are formed in the intake side slope 16 thereof, and a plug hole 19 is formed in the apex 18 so as to protrude a spark plug (not shown) into the combustion chamber 17.

Still furthermore, as FIG. 1 shows, an exhaust port 23 and an intake port 24 are made in the cylinder head 13 and communicate with the exhaust hole portions 21 and 21 and the exhaust hole portions 22 and 22, respectively.

Yet furthermore, the cylinder head 13 has, in its side surface, an air intake (not shown) for taking in fresh air, and this air intake communicates with the intake port 23 and the intake hole portions 22 and 22.

As mentioned above, the air intake is provided in a lateral portion of the cylinder 13, and the intake side slope 16 having the intake hole portions 22 and 22 formed therein is made in a state inclined as indicated by $\theta_b$ in FIG. 1, which enables the intake air to be led obliquely into the combustion chamber 17, thereby enhancing the positive tumble flow (mentioned later).

Moreover, the intake port 23 is equipped with an injector (fuel injector; not shown) and, in the intake port 23, fuel is injected at a rear side (opposite side from the combustion chamber 17) of umbrella-like portions 26B of intake valves 26. This is for the purpose of promoting the vaporization of the fuel by injecting the fuel toward the umbrella-like portions 26B and 26B of the intake valves 26 and 26 heated by the combustion in the combustion chamber 17.

The exhaust hole portions 21 and 21 are made to be openable and closable by exhaust valves 25 and 25, and the intake hole portions 22 and 22 are made to be openable and closable by the intake valves 26 and 26.

Of these, each of the exhaust valves 25 and 25 is composed of a shaft portion 25A extending in the lifting direction thereof and an umbrella-like portion 25B provided at an end portion of the shaft portion 25A on the combustion chamber 17 side. The umbrella-like portion 25B of the exhaust valve 25 is located along the exhaust side slope 15.

Likewise, each of the intake valves 26 and 26 is composed of a shaft portion 26A extending in the lifting direction thereof and an umbrella-like portion 26B provided at an end portion of the shaft portion 26A on the combustion chamber 17 side. The umbrella-like portion 26B of the intake valve 26 is located along the intake side slope 16.

Moreover, the exhaust valves 25 and 25 are made to be opened and closed while following an exhaust cam (not shown), while the intake valves 26 and 26 are driven by a continuous variable valve lift mechanism 27 to take opening and closing positions.

Although the detailed description of this continuous variable valve lift mechanism 27 will be omitted because of an already well-known technique, in short it is for conducting the opening/closure of the intake valves 26 and 26 and for finely changing the quantity of lift (valve opening/closing quantity) thereof and, more concretely, it is designed to vary the lift quantity continuously (in a stepless fashion). This continuous variation of the lift quantity of the intake valves 26 and 26 is realized in a manner such that the displacement quantity of a link mechanism (not shown) connected mechanically to the intake valves 26 and 26 is changed according to the acceleration pedal depressing quantity. Incidentally, it is also acceptable that a valve lift mechanism capable of changing the lift quantity in a stepwise fashion is employed in place of the continuous variable valve lift mechanism 27 capable of changing the lift quantity continuously.

In addition, at an outer edge of each of the intake hole portions 22 and 22, a shroud (flow promoting device; projection portion) 28 is formed so as to extend from one end portion 28A to the other end portion 28B, thereby promoting the production of a tumble flow in the combustion chamber 17. This tumble flow, which is equally referred to as a vertical whirlpool, signifies an eddy current having a center of rotation in a direction perpendicular to the reciprocating directions of the piston and denotes an air flow occurring in the combustion chamber 17. Moreover, this tumble flow includes a positive tumble flow and a reverse tumble flow.

Of these, as indicated by an arrow $T_{B+}$ in FIG. 1, the "positive tumble flow" is a tumble flow moving counterclockwise in the illustration from the intake hole portions 22 and 22 through the cylinder apex 18 and the exhaust side slope 15 toward a lower side of the combustion chamber 17.

On the other hand, as indicated by an arrow $T_{B-}$ in FIG. 1, the reverse tumble flow" is a tumble flow moving clockwise (opposite direction) in the illustration directly from the intake hole portions 22 and 22 to a lower side of the combustion chamber 17.

Each of the shrouds 28, 28 is for promoting the production of the positive tumble flow $T_{B+}$ and, in particular, it can enhance the production of the positive tumble flow $T_{B+}$ relatively by suppressing the generation of the reverse tumble flow $T_{B-}$ in a case in which the intake valve 26 takes a small lift quantity.

In addition, each of the shrouds 28 and 28 is made to protrude toward the combustion chamber 17 on the intake side slope 16 of the cylinder head 13 and is formed on only the opposite side from the exhaust hole portion 21 and 21 located side (that is, of the outer edge of each of the intake hole portions 22 and 22, a semicircle on the right side in FIG. 2).

Still additionally, one end of each of the shrouds 28 and 28 is referred to as one end portion 28A while the other end thereof is referred to as the other end portion 28B and, in the first embodiment, the one end portion 28A of each of the shrouds 28 and 28 lies on the straight line connecting the central points $C_1$ and $C_1$ of the intake valves 26 and 26 and between the intake hole portions 22 and 22. On the other hand, each of the other end portions 28B and 28B lie on the opposite side to the corresponding one end portion 28A so that the intake hole portions 22 and 22 are interposed between the other end portions 28B and 28B.

Yet additionally, each of the shrouds 28 and 28 is formed so as not to go across the lower end plane 13A of the cylinder head 13 toward the cylinder block 12 side (that is, the downward side in FIG. 1). More concretely, it is formed at an upper portion of the combustion chamber 17 in a state spaced by a distance indicated by arrows h1 in FIG. 1 from the cylinder head lower end plane 13A.

Moreover, each of the shrouds 28 and 28 is formed such that its height (see arrows $h_2$ in FIG. 1) becomes approximately 1.0 millimeter with respect to the intake side slope 16. In this connection, this height $h_2$ is not limited to approximately 1.0 millimeter, but the height of each of the shrouds 28 and 28 is properly changeable if it is set at a value smaller than 2.0 millimeter. A description will be given hereinafter of this point. The displacement volume per cylinder of the engine 10 according to this embodiment is approximately 165 cc.

The structure of the combustion chamber according to the first embodiment of the present invention, made as described above, can provide the following effects and advantages.

FIG. 3 is a graph showing a result obtained through an experiment where the vertical axis indicates a tumble ratio in the combustion chamber 17 and the horizontal axis indicates a lift quantity of the intake valves 26 and 26.

In this case, the "tumble ratio in the combustion chamber 17" signifies a value showing a speed of rotation of an air current in the combustion chamber 17 which occurs during one intake stroke. Accordingly, this tumble ratio shows that the motion of the air current in the combustion chamber 17 becomes better as the absolute value thereof becomes larger.

Incidentally, a positive tumble ratio signifies a positive tumble while a negative tumble ratio denotes a reverse tumble.

In addition, in this graphic illustration, the lift quantity indicated by $VL_{min}$ designates a minimum lift quantity of the intake valves 26 and 26 while the lift quantity indicated by $VL_{max}$ represents a maximum lift quantity of the intake valves 26 and 26.

Still additionally, in this graphic illustration, a line obtained by making connections between the points indicated by square marks shows a case of an engine having a combustion engine in which a shroud is not formed, that is, a case of a common engine.

On the other hand, a line obtained by making connections between the points indicated by cross (X) marks shows a case in which an engine 10 has a combustion chamber 17 equipped with shrouds 28 and 28 each formed to have a height of 0.5 millimeter, and a line obtained by making connections between the points indicated by circle (○) marks shows a case of an engine 10 having a combustion chamber 17 equipped with shrouds 28 and 28 each having a height of 1.0 millimeter. Moreover, a line obtained by making connections between the points indicated by plus (+) marks shows a case of an engine 10 having a combustion chamber 17 equipped with shrouds 28 and 28 each having a height of 1.5 millimeter, and a line obtained by making connections between the points indicated by triangle (Δ) marks shows a case of an engine 10 having a combustion chamber 17 equipped with shrouds 28 and 28 each having a height of 2.0 millimeters.

As shown in FIG. 3, in a case in which the lift quantity of the intake valves 26 and 26 is at a minimum (that is, when $VL_{min}$), the common engine having no shroud cannot attain a large tumble ratio, while the engine 10 having the combustion chamber 17 equipped with the shrouds 28 and 28 can provide tumble ratios higher than that of the common engine. In particular, it is seen that, when the height of the shrouds 28 and 28 is set at 1.0 to 2.0 millimeters, large tumble ratios are obtainable.

Secondly, with reference to a graph shown in FIG. 4, a description will be given hereinbelow of the relationship between a flow coefficient and a lift quantity of the intake valves 26 and 26. This "flow coefficient" signifies the degree of ease of flow of intake air through the intake hole portions 22 and 22 into the combustion chamber 17 and signifies that the flow of the intake air into the combustion chamber 17 becomes easier as the value thereof becomes higher. In the graph of FIG. 4, the vertical axis represents a flow coefficient and the horizontal axis depicts a lift quantity of the intake valves 26 and 26.

In addition, as well as FIG. 3, in FIG. 4, $VL_{min}$ and $VL_{max}$ represent minimum and maximum lift quantities of the intake valves 26 and 26, respectively, and the marks (i.e., square marks, cross marks, circle marks, plus marks and triangle marks) used in the graph of FIG. 4 designate the same objects as those in FIG. 3.

In the engine 10 of the present embodiment, in a case in which the lift quantity of the intake valves 26 and 26 shifts from the minimum value ($VL_{min}$) to the maximum value ($VL_{max}$), that is, in the entire region of the lift quantity of the intake valves 26 and 26, the flow coefficient thereof is apparently at the same level as an engine in which the shrouds 28 and 28 are not formed irrespective of the height $h_2$.

However, in terms of the flow coefficient in the actual case, it is more preferable to examine the flow coefficients from the minimum lift quantity to an arbitrary lift quantity, i.e. the integration of flow coefficients, without examining only the arbitrary lift quantity.

For example, when the lift quantity of the intake valves 26 and 26 reaches the maximum value ($VL_{max}$), a value obtained by adding up all the flow coefficients from the minimum lift quantity to the maximum lift quantity can be considered as the practical flow coefficient at the maximum lift quantity.

Examining the graph of FIG. 4 in view of this situation, in the case indicated by the triangle marks, that is, when the height $h_2$ of the shrouds 28 and 28 is set at 2.0 millimeters and the lift quantity of the intake valves 26 and 26 is set at the maximum (see triangle marks in the illustration), a decrease in the substantial flow coefficient is not negligible. On the other hand, when the height $h_2$ of the shrouds 28 and 28 is set to be 1.5 millimeters and below, a decrease in the substantial flow coefficient scarcely occurs and, in the actual operation, it is generally the same as a case of no formation of shrouds.

In other words, when the height $h_2$ of the shrouds 28 and 28 provided in the combustion chamber 17 of the engine 10 is set at 2.0 millimeters or more, the hindrance of the flow of intake air into the combustion chamber 17 arises. On the other hand, if the height $h_2$ of the shrouds 28 and 28 is set to be below 2.0 millimeters, the flow of intake air into the combustion chamber 17 is preventable from the hindrance.

In particular, in a case in which the lift quantity of the intake valves 26 and 26 varying continuously according to the required output torque of the engine 10 is at the maximum (at $VL_{max}$), the case of no substantial decrease in flow coefficient signifies no degradation of the full-opening performance of the engine 10 according to this embodiment which has the combustion chamber 17 equipped with the shrouds 28 and 28 whose height is less than 2.0 millimeters.

Therefore, as shown by the graphs of FIGS. 3 and 4, it is preferable that the height $h_2$ of the shrouds 28 and 28 is set at 1.0 millimeter or more but at a value below 2.0 millimeters. In addition, when the shrouds 28 and 28 are set to have such a preferable value, it is possible to greatly improve the combustion stability, the exhaust gas performance and the fuel consumption if the intake air quantity into the combustion chamber 17 is small, while securing the full-opening performance of the engine 10.

As described above, with the structure of the combustion chamber of an engine according to the first embodiment of the present invention, although the intake air quantity into the combustion chamber 17 becomes little in a case in which the lift quantity of the intake valves 26 and 26 is at a minimum (at $VL_{min}$), even in this case, it is possible to promote the movement of the air flow into the combustion chamber 17, which contributes to the improvement of the combustion stability, exhaust gas performance and fuel consumption of the engine 10.

Moreover, in a case in which the lift quantity of the intake valves 26 and 26 is at a minimum (at $VL_{max}$), that is, even when the output torque demand to the engine 10 is at a maximum, a decrease in flow coefficient of the intake air into the combustion chamber 17 scarcely occurs, thus avoiding a decrease in torque to be outputted from the engine 10.

Still moreover, by producing a positive tumble flow $T_{B+}$ in the combustion chamber 17, particularly, by producing a strong positive tumble flow $T_{B+}$ in the case of a small lift quantity of the intake valves 26 and 26, the promotion of air flow in the combustion chamber 17.

Yet moreover, when the shrouds 28 and 28 are formed so as not to go across the lower end plane 13A of the cylinder head 13, at the grinding of the lower end plane 13A of the cylinder head 13, it is possible to prevent the shrouds 28 and 28 from standing in the way, which can improve the workability and productivity of the cylinder head 13.

In addition, the improvement of manufacturing accuracy of the cylinder head lower end plane 13A can prevent a gap from appearing between the cylinder head 13 and the cylinder block 12, thereby improving the airtightness of the engine 10 and enhancing the output torque of the engine 10.

Still additionally, when the height $h_2$ of each of the shrouds 28 and 28 is set to be below 2.0 millimeters with respect to the intake side slope 16, the securement of the full-opening performance of the engine 10 and the improvement of the combustion stability, exhaust gas performance and fuel consumption in the case of a small intake air flow into the combustion chamber 17 are compatible with each other in a high order.

Secondly, referring to the drawings, a description will be given hereinbelow of a structure of a combustion chamber of an engine according to a second embodiment of the present invention. The drawings used above for the explanation of the first embodiment will sometimes be used for the description of the second embodiment.

Figure 5:
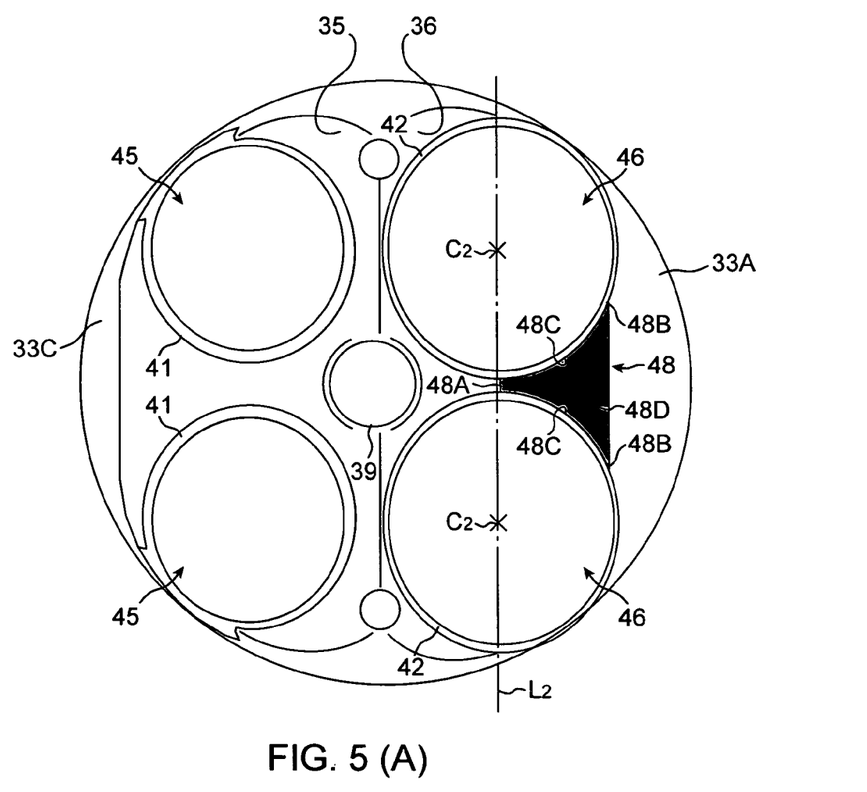
FIG. 5(A) is a plan view illustratively showing a structure of a combustion chamber of an engine according to a second embodiment of the present invention when a cylinder head is viewed from a cylinder block side.
FIG. 5(B) is a cross-sectional view illustratively showing a structure of a combustion chamber of an engine according to the second embodiment of the present invention.

As shown in FIG. 5(B), an engine 30 is mainly made up of a cylinder block 32 and a cylinder head 33. In addition, a cylinder 34 is formed in the cylinder block 32, and an exhaust side slope (first inclination surface) 35 and an intake side slope (second inclination surface) 36 are made in the cylinder head 33. Still additionally, a combustion chamber 37 is defined as a space surrounded by the cylinder 34, the exhaust side slope 35, the intake side slope 36 and an upper surface of a piston (not shown).

Moreover, the exhaust side slope 35 and the intake side slope 36 in the cylinder head 33 are made to extend, in a state inclined, from an apex 38 forming the highest portion of the combustion chamber 37 toward both lower sides, with an upper wall of the combustion chamber 37 being shaped into a pentroof configuration. The inclination angle of the exhaust side slope 35 is set at $\theta_c$ with respect to lower end planes 33A and 33C of the cylinder head 33, and the inclination angle of the intake side slope 36 is set at $\theta_d$ with respect to the cylinder head lower end planes 33A and 33C.

Furthermore, as shown in FIG. 5(A), two exhaust hole portions 41 and 41 are made in the exhaust side slope 35 of the cylinder head 33 while two intake hole portions 42 and 42 are formed in the intake side slope 36 thereof, and a plug hole 39 is formed in the apex 38 so as to protrude a spark plug (not shown) into the combustion chamber 37.

Still furthermore, an exhaust port (not shown) and an intake port (not shown) are made in the cylinder head 33 and communicate with the exhaust hole portions 41 and 41 and the exhaust hole portions 42 and 42, respectively.

Yet furthermore, the cylinder head 33 has, in its side surface, an air intake (not shown) for taking in fresh air, and this air intake communicates with the intake port and the intake hole portions 42 and 42.

As mentioned above, the air intake is provided in a lateral portion of the cylinder 33, and the intake side slope 36 having the intake hole portions 42 and 42 formed therein is made in a state inclined as indicated by $\theta_d$ in FIG. 5(B), which enables the intake air to be led obliquely into the combustion chamber 37, thereby enhancing the positive tumble flow $T_{B+}$.

Moreover, the intake port is equipped with an injector (fuel injector) and, in the intake port, fuel is injected at a rear side of umbrella-like portions 46B of intake valves 46.

Still moreover, the exhaust hole portions 41 and 41 are made to be openable and closable by exhaust valves 45 and 45, and the intake hole portions 42 and 42 are made to be openable and closable by the intake valves 46 and 46.

Of these, each of the exhaust valves 45 and 45 is composed of a shaft portion 45A extending in the lifting direction thereof and an umbrella-like portion 45B provided at an end portion of the shaft portion 45A on the combustion chamber 37 side. The umbrella-like portion 45B of the exhaust valve 45 is located along the exhaust side slope 35.

Likewise, each of the intake valves 46 and 46 is composed of a shaft portion 46A extending in the lifting direction thereof and an umbrella-like portion 46B provided at an end portion of the shaft portion 46A on the combustion chamber 37 side. The umbrella-like portion 46B of the intake valve 46 is located along the intake side slope 36.

In addition, the exhaust valves 45 and 45 are made to be opened and closed while following an exhaust cam (not shown), while the intake valves 46 and 46 are driven by a continuous variable valve left mechanism (not shown) to take opening and closing positions. This continuous variable valve lift mechanism is the same as the continuous variable valve lift mechanism 27 described in the first embodiment, and the description thereof will be omitted for simplicity.

Still additionally, at an outer edge of each of the intake hole portions 42 and 42, a shroud (flow promoting device; projection portion) 48 is formed so as to promote the production of a positive tumble flow $T_{B+}$. In particular, when the lift quantity of the intake valves 46 and 46 is small, it suppresses the generation of the reverse tumble flow $T_{B-}$, thereby relatively enhancing the production of a positive tumble flow $T_{B+}$.

This shroud 48 is composed of circumferential edge portions 48C, 48C formed on the intake side slope 36 so as to rise or protrude toward the combustion chamber 37 side and to extend from each of one end portions 48A, 48A to each of the other end portion 48B, 48B, respectively, and a land portion 48D formed so as to stand in a region surrounded by the one end portions 48A, 48A, the other end portions 48B, 48B and the circumferential edge portions 48C, 48C and to rise or protrude toward the combustion chamber 37 side.

Yet additionally, the one end portions 48A and 48A of the shroud 48 according to the second embodiment lies on the straight line $L_2$ connecting the central points $C_2$ and $C_2$ of the intake valves 46 and 46 and are formed between the intake hole portions 42 and 42, while the other end portions 48B and 48B thereof reside on the intake side slope 36, at the outer edge portions of the intake hole portions 42 and 42 and in the vicinity of the cylinder lower end plane 33A.

Moreover, a lower edge portion 48E of the shroud 48 is made to have the same height as those of the lower end planes 33A and 33C.

Figure 6:
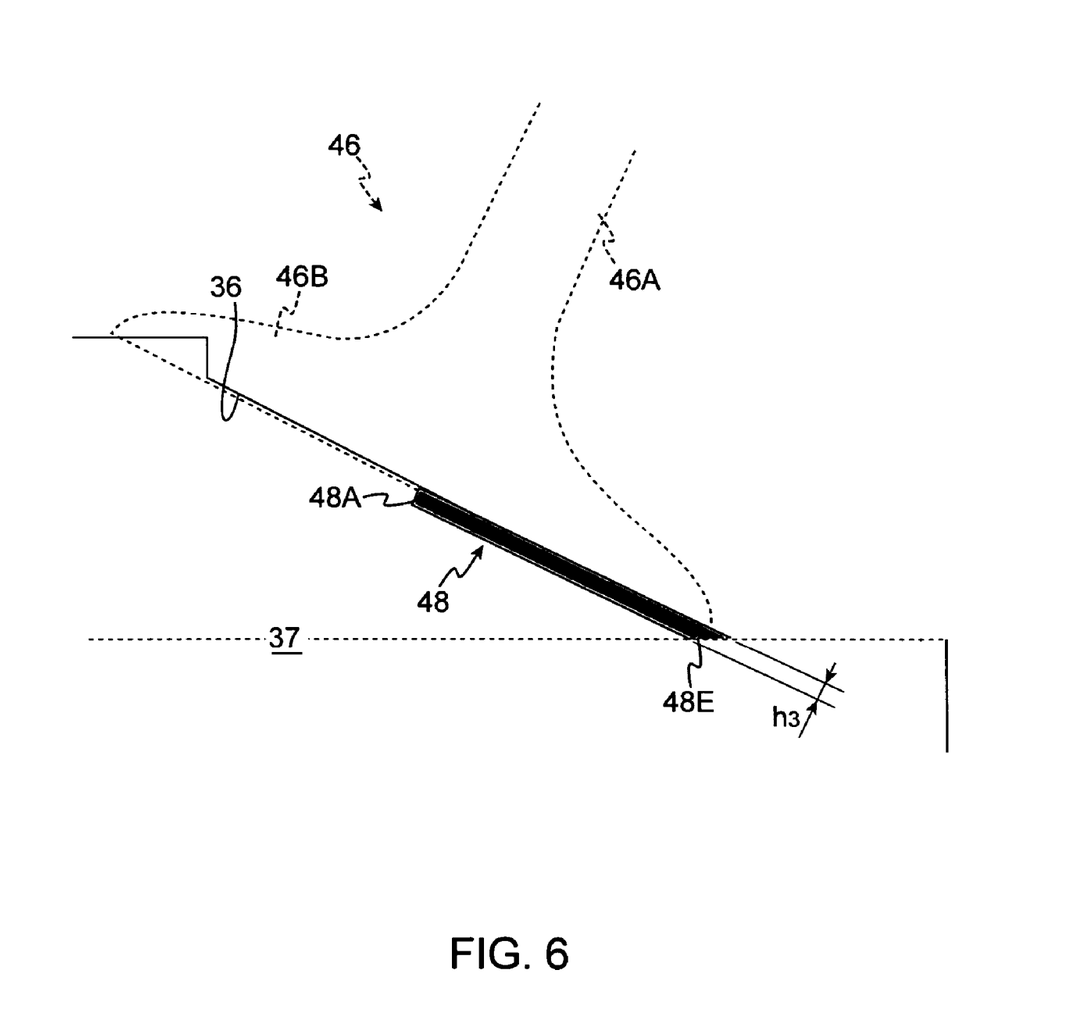
FIG. 6 is a cross-sectional view illustratively showing a structure of a combustion chamber of an engine according to the second embodiment of the present invention and is an illustration of a structure in the vicinity of an intake valve thereof.

Still moreover, as shown in FIG. 6, the shroud 48 is formed such that the height (see arrows $h_3$ in FIG. 6) relative to the intake side slope 36 is approximately 1.0 millimeter. Incidentally, this height $h_3$ is not limited to approximately 1.0 millimeter, but this height $h_3$ can properly be changed provided that it is below 2.0 millimeters.

The structure of the engine combustion chamber according to the second embodiment, designed as described above, can provide the following effects and advantages.

Figure 7:
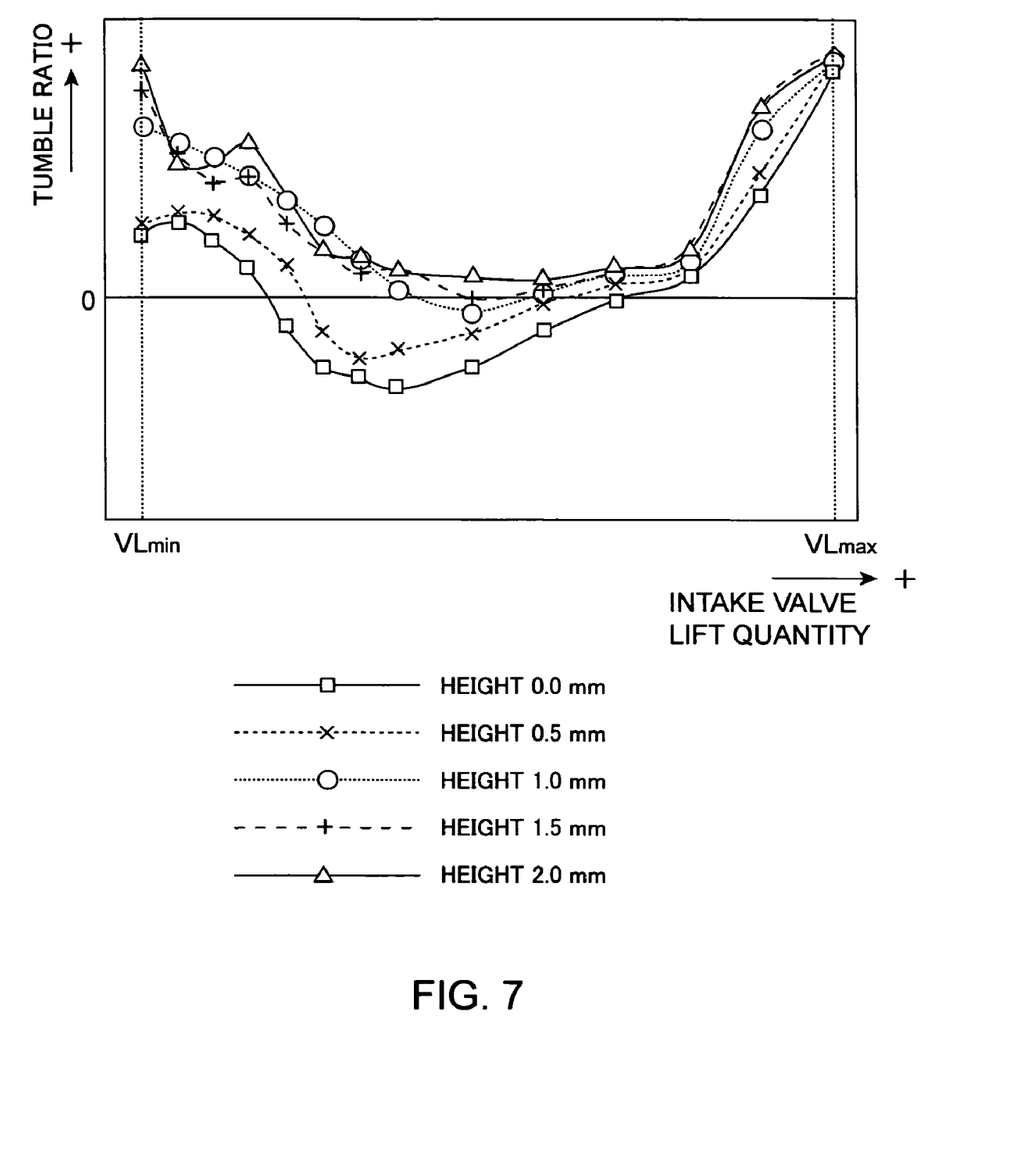
FIG. 7 is an graphic diagram illustratively showing the relationship between the degree of air flow and a quantity of lift of an intake valve in a structure of a combustion chamber of an engine according to the second embodiment of the present invention.

First, with respect to the relationship between a lift quantity of the intake valves 46, 46 and a tumble ratio in the engine 30, the almost same result as that shown in FIG. 3 used for the description of the first embodiment was obtained. That is, also in the engine 30 according to this embodiment, as shown in FIG. 7, a higher tumble ratio than that of a common engine is obtainable and, in particular, a high tumble ratio is attainable in a case in which the height $h_2$ is set at 1.0 to 2.0 millimeters.

Figure 8:
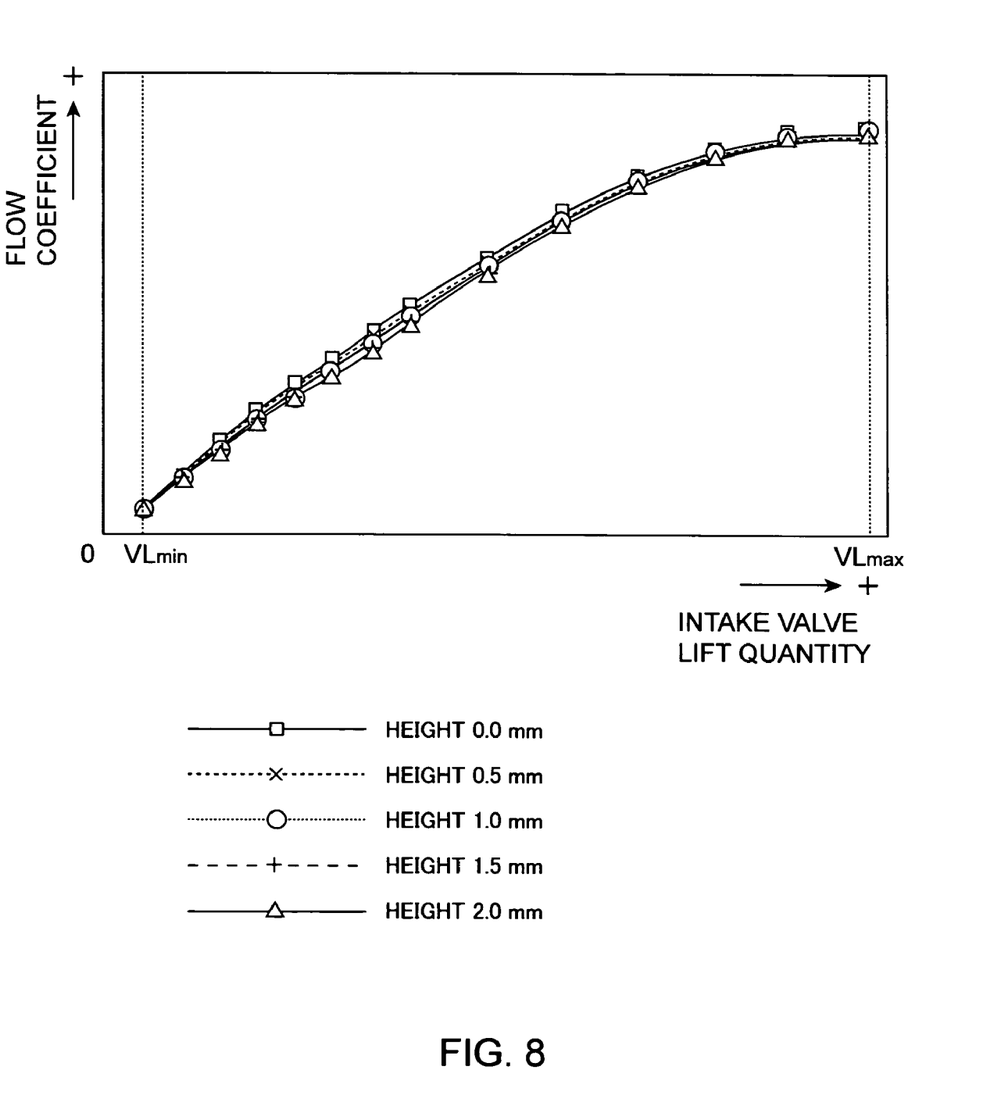
FIG. 8 is a graphic diagram illustratively showing the relationship between a suction flow and a quantity of lift of an intake valve in a structure of a combustion chamber of an engine according to the second embodiment of the present invention.

Furthermore, with respect to the relationship between a lift quantity of the intake valves 46, 46 and a flow coefficient in the engine 30, the almost same result as that shown in FIG. 4 used for the description of the first embodiment was also obtained. That is, also in the engine 30 according to this embodiment, as shown in FIG. 8, a substantial decrease in flow coefficient is not ignorable in a case in which the height $h_2$ of the shroud 48 is set at 2.0 millimeter and the lift quantity of the intake valves 46 and 46 is set at a maximum.

On the other hand, in a case in which the height $h_2$ of the shroud 48 is set at a value below 2.0 millimeters, the substantial decrease in flow coefficient little occurs and, in the actual operation, the almost same flow coefficient as that in the case of no formation of a shroud is obtainable.

In other words, when the height $h_2$ of the shroud 48 provided in the combustion chamber 37 of the engine 30 is set at 2.0 millimeters or more, the flow of the intake air into the combustion chamber 37 is hindered particularly if the lift quantity of the intake valves 46 and 46 are increased. Conversely, when the height $h_2$ of the shroud 48 is set at a value below 2.0 millimeters, the substantial hindrance of the flow of the intake air into the combustion chamber 37 does not occur, which provides a preferable state.

Moreover, in a case in which the lift quantity of the intake valves 46 and 46 continuously varying according to the output torque required to the engine 30 reaches the maximum value ($VL_{max}$), a state of no substantial decrease in flow coefficient signifies that a degradation in full-opening performance does not occur in the engine 30 according to this embodiment which has the combustion chamber 37 equipped with the shroud 48 whose height is below 2.0 millimeters.

Therefore, also in this embodiment, it is preferable that the height $h_2$ of the shroud 48 is set at 1.0 millimeter or more but at a value below 2.0 millimeters. Moreover, if the shroud 48 is set to have this preferable height, it is possible to considerably improve the combustion stability, the exhaust gas performance and the fuel consumption when the intake air quantity into the combustion chamber 37 is small, while securing the full-opening performance of the engine 30.

As described above, with the structure of a combustion chamber of an engine according to the second embodiment of the present invention, when the lift quantity of the intake valves 46 and 46 is at a minimum ($VL_{min}$), the quantity of intake air into the combustion chamber 37 becomes small and, even in this case, it is possible to promote the motion of the air flow into the combustion chamber 37, which contributes to the improvement of the combustion stability, exhaust gas performance and fuel consumption of the engine 30.

In addition, when the lift quantity of the intake valves 46 and 46 is at a maximum ($VL_{max}$), that is, even if a maximum output torque requirement is imposed to the engine 30, the decrease in flow coefficient of the intake air into the combustion chamber 37 scarcely occurs, thereby avoiding a situation of a decrease in torque to be outputted from the engine 30.

Still additionally, by producing a positive tumble flow $T_{B+}$ in the combustion chamber 37, particularly by producing a strong positive tumble flow $T_{B+}$ in the case of a small lift quantity of the intake valves 46 and 46, the promotion of the motion of air flow in the combustion chamber 37 is achievable.

Yet additionally, when the shroud 48 is formed so as not to go across the lower end planes 33A and 33C of the cylinder head 33, at the grinding of the lower end planes 33A and 33C of the cylinder head 33, it is possible to prevent the shroud 48 from interfering with the grinding, which can improve the workability and productivity of the cylinder head 33.

Moreover, the improvement of manufacturing accuracy of the cylinder head lower end planes 33A and 33C can prevent a gap from appearing between the cylinder head 33 and the cylinder block 32, thereby improving the airtightness of the engine 30 and enhancing the output torque of the engine 30.

Still moreover, when the height $h_2$ of the shroud 48 is set to be below 2.0 millimeters with respect to the intake side slope 36, the securement of the full-opening performance of the engine 30 and the improvement of the combustion stability, exhaust gas performance and fuel consumption in the case of a small intake air flow into the combustion chamber 37 are compatible with each other in a high order.

Although the description has been given above of the first and second embodiments of the present invention, it should be understood that the present invention is not limited to the above-described embodiments, and that it is intended to cover all changes and modifications of the embodiments of the invention herein which do not constitute departures from the spirit and scope of the invention.

Figure 9:
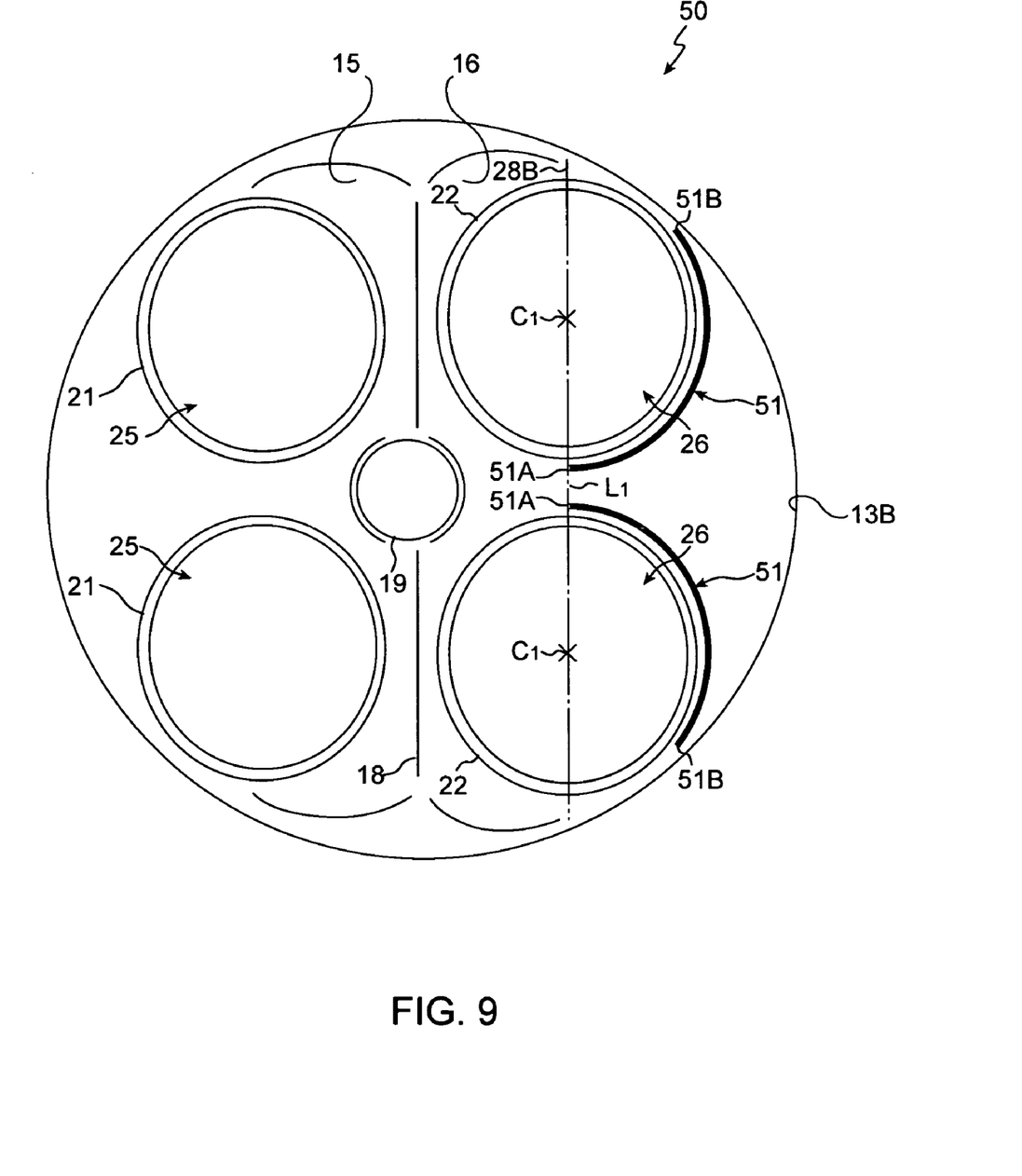
FIG. 9 is a plan view illustratively showing a structure of a combustion chamber of an engine according to a modification of the first embodiment of the present invention when a cylinder head is viewed from a cylinder block side.

For example, it is also appropriate that shrouds 51 and 51 are formed as shown in FIG. 9. Although a cylinder head 50 shown in FIG. 9 is essentially similar to the cylinder head 13 shown in FIG. 2 use for the description of the first embodiment and is one modification of the first embodiment, there is a difference in that, in the cylinder head 50 shown in FIG. 9, a side wall portion (inner circumferential portion of the combustion chamber) 13B and intake hole portions 22, 22 are closer to each other in comparison with that of the cylinder head 13 shown in FIG. 2.

Accordingly, in the cylinder head 50 shown in FIG. 9, difficulty is experienced in forming the shrouds 51 and 51 along the semicircles of the outer edges of the intake hole portions 22 and 22. For this reason, each of the other end portions 51B and 51B of the shrouds 51 and 51 is formed at the outer edge of each of the intake hole portions 22 and 22 on the opposite side from each of the exhaust hole portions 21 and 21 and in the vicinity of the side wall portion 13B. In addition, each of the shrouds 51 and 51 is formed on the intake side slope 16 so as to protrude toward the combustion chamber 17 between each of the one end portions 51A, 51A and each of the other end portions 51B, 51B.

Thus, when the shrouds 51 and 51 as long as possible are formed in a range that the layout of the combustion chamber 17 permits, even in a case in which the lift quantity of the intake valves 26 and 26 is small, a positive tumble flow is producible in the combustion chamber 17, which promotes the intake air flow so as to contribute to the improvement of the combustion stability, exhaust gas performance and fuel consumption of the engine 10.

Moreover, even in a case in which there is a requirement for a maximum engine output, it is possible to generate a high engine output according to the requirement without causing a decrease in flow rate of intake air into the combustion chamber 17.

Also in this cylinder head 50, the relationship between an intake valve lift quantity and a tumble ratio, which is almost equal to that shown in FIG. 3 used for the description of the first embodiment, is obtainable, and the relationship between an intake valve lift quantity and a flow coefficient, which is almost equal to that shown in FIG. 4 used for the description of the first embodiment, is attainable.

Therefore, even in a case in which the shrouds 51 and 51 are formed in the cylinder head 50 shown in FIG. 9, it is preferable that the height $h_2$ thereof is set to be below 2.0 millimeters but 1.0 millimeter or more.

Figure 10:
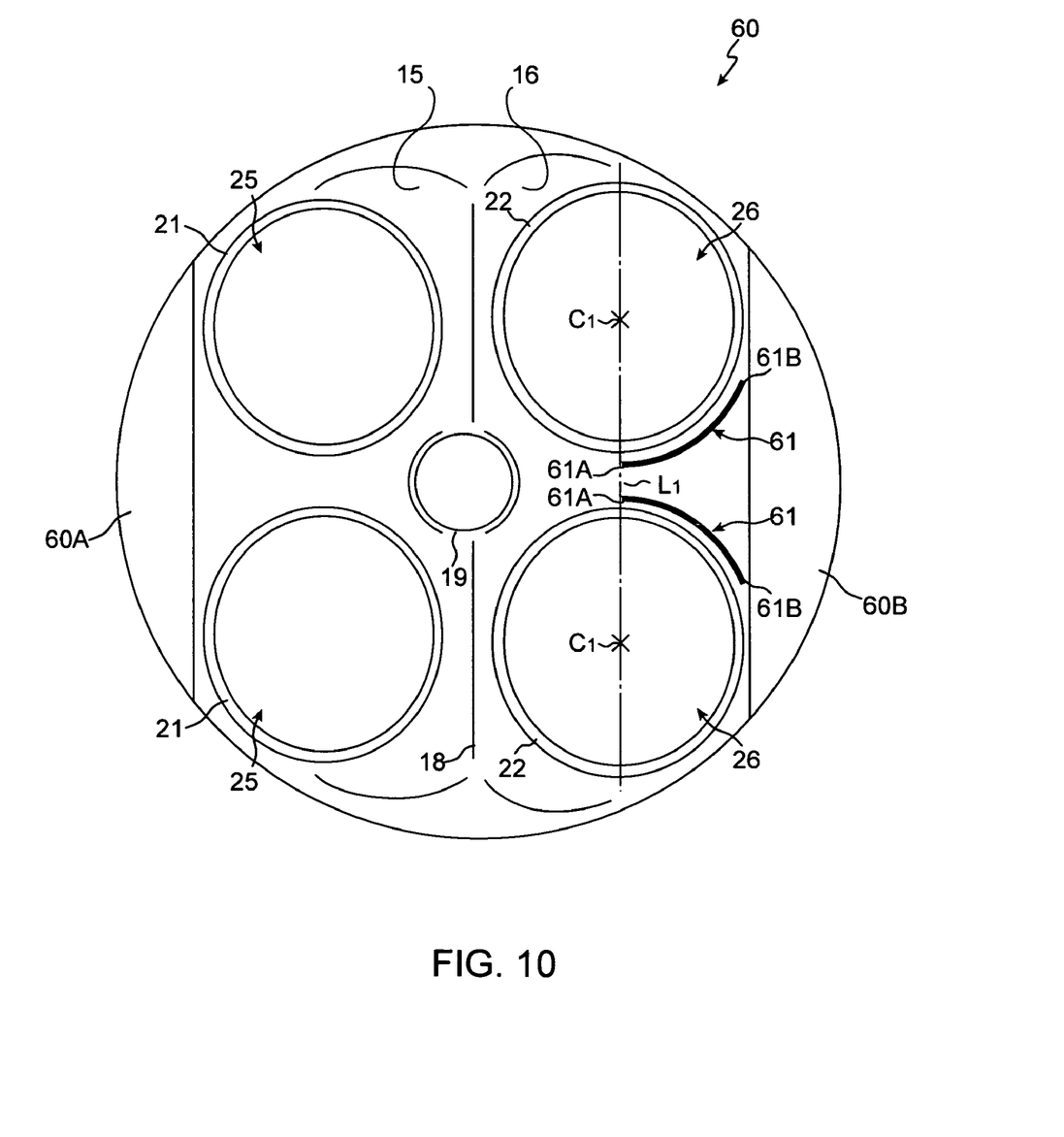
FIG. 10 is a plan view illustratively showing a structure of a combustion chamber of an engine according to another modification of the first embodiment of the present invention when a cylinder head is viewed from a cylinder block side.

As another example, it is also appropriate that shrouds 61 and 61 are formed as shown in FIG. 10. A cylinder head 60 shown in FIG. 10 is essentially similar to the cylinder head 13 shown in FIG. 2 used for the description of the first embodiment and is a further modification of the first embodiment while the cylinder head 60 differs from the cylinder head 13 shown in FIG. 2 in that lower end portions 60A and 60B constituting a lower end of the cylinder head 60 are formed in close vicinity to exhaust hole portions 21, 21 and intake hole portions 22, 22, respectively.

In addition, although, on an intake side slope 16 of this cylinder head 60, the shrouds 61 and 61 are made to protrude toward the combustion chamber 17 between one end portions 61A, 61A and the other end portions 61B, 61B, since the lower end portion 60B of the cylinder head 60 is formed to be close to the intake hole portions 22 and 22, difficulty is encountered in forming the shrouds 61 and 61 along semicircles of outer edges of the intake hole portions 22 and 22.

For this reason, in the cylinder head 60 shown in FIG. 10, the other end portions 61B and 61B of the shrouds 61 and 61 are formed along outer edges of the intake hole portions 22 and 22 on the opposite side from the exhaust hole portions 21 and 21 and in close vicinity to the lower end portion 60B.

Thus, when the shrouds 61 and 61 as long as possible are formed in a range that the layout of the combustion chamber 17 permits, even in a case in which the lift quantity of the intake valves 26 and 26 is small, a positive tumble flow is producible in the combustion chamber 17, which promotes the intake air flow so as to contribute to the improvement of the combustion stability, exhaust gas performance and fuel consumption of the engine 10.

Moreover, even in a case in which there is a requirement for a maximum engine output, it is possible to generate a high engine output according to the requirement without causing a decrease in flow rate of intake air into the combustion chamber 17.

Also in this cylinder head 60, the relationship between an intake valve lift quantity and a tumble ratio, which is almost equal to that shown in FIG. 3 used for the description of the first embodiment, is obtainable, and the relationship between an intake valve lift quantity and a flow coefficient, which is almost equal to that shown in FIG. 4 used for the description of the first embodiment, is attainable.

Therefore, even in a case in which the shrouds 61 and 61 are formed in the cylinder head 60 shown in FIG. 10, it is preferable that the height $h_2$ thereof is set to be below 2.0 millimeters but 1.0 millimeter or more.

Although in the description of the embodiments two exhaust hole portions and two intake hole portions are formed as example, the present invention is not limited to this. For example, the present invention is also applicable to a structure composed of one exhaust hole portion and one intake hole portion and a structure composed of two exhaust hole portions and three intake hole portions.

In addition, naturally, the present invention is also applicable to a structure composed of three or more exhaust hole portions and three or more intake hole portions.

Still additionally, the present invention is also applicable to an engine of a type in which fuel is directly injected into a cylinder.

Yet additionally, although in the above-described embodiments and modifications an engine whose displacement per cylinder is approximately 165 cc is taken as an example, it is also acceptable that a displacement per cylinder is, for example, approximately 165 to 600 cc.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structured combustion chamber for an engine, comprising:
    a cylinder head including an intake hole portion which makes a communication between an intake port and a combustion chamber and an exhaust hole portion which makes a communication between an exhaust port and said combustion chamber;
    an intake valve for opening and closing said intake hole portion;
    a continuous variable valve lift mechanism for lifting said intake valve in a stepless fashion; and
    a flow promoting device made to promote a motion of an air current in said combustion chamber when a quantity of lift of said intake valve driven by said continuous variable valve lift mechanism is small and made to suppress a decrease in flow rate of an intake air coming through said intake hole portion into said combustion chamber when the quantity of lift of said intake valve driven by said continuous variable valve lift mechanism reaches a maximum,
    wherein said flow promoting device is made as a projection extending along only a portion of an outer edge of said intake hole portion and protruded toward said combustion chamber, with said portion of said outer edge of said intake hole portion being positioned on the opposite side from said exhaust hole portion.

2. The structured combustion chamber for an engine according to claim 1, wherein a plurality of intake hole portions are formed as said intake hole portion in said cylinder head and said projection is formed for each of said intake hole portions, and said projection has one end portion and the other end portion, with the one end portion of each of said projections being positioned between said intake hole portions and the other end portion thereof being positioned in the vicinity of an inner circumferential portion of said combustion chamber so that said projection is formed to extend from the one end portion to the other end portion.

3. The structured combustion chamber for an engine according to claim 1, wherein a plurality of intake hole portions are formed as said intake hole portion in said cylinder head and said projection is formed for each of said intake hole portions, and said projection has one end portion and the other end portion, with the one end portion of each of said projections being positioned between said intake hole portions and the other end portion thereof being positioned in the vicinity of a lower end plane of said cylinder head so that said projection is formed to extend from the one end portion to the other end portion.

4. The structured combustion chamber for an engine according to claim 1, wherein a plurality of intake hole portions are formed as said intake hole portion in said cylinder head and said projection is formed for each of said intake hole portions, and said projection has one end portion positioned between said intake hole portions so that each of said projections is provided along a semicircle of said outer edge of the corresponding one of said plurality of intake hole portions from said one end portion of said projection.

5. The structured combustion chamber for an engine according to claim 1, wherein said projection is formed so as not to go across a lower end plane of said cylinder head.

6. The structured combustion chamber for an engine according to claim 5, wherein a height of said projection is set at a value below 2 millimeters.

7. The structured combustion chamber for an engine according to claim 1, wherein a height of said projection is set at a value below 2 millimeters.

8. The structured combustion chamber for an engine according to claim 2, wherein said projection is formed so as not to go across a lower end plane of said cylinder head.

9. The structured combustion chamber for an engine according to claim 8, wherein a height of said projection is set at a value below 2 millimeters.

10. The structured combustion chamber for an engine according to claim 2, wherein a height of said projection is set at a value below 2 millimeters.

11. The structured combustion chamber for an engine according to claim 3, wherein said projection is formed so as not to go across a lower end plane of said cylinder head.

12. The structured combustion chamber for an engine according to claim 11, wherein a height of said projection is set at a value below 2 millimeters.

13. The structured combustion chamber for an engine according to claim 3, wherein a height of said projection is set at a value below 2 millimeters.

14. The structured combustion chamber for an engine according to claim 4, wherein said projection is formed so as not to go across a lower end plane of said cylinder head.

15. The structured combustion chamber for an engine according to claim 14, wherein a height of said projection is set at a value below 2 millimeters.

16. The structured combustion chamber for an engine according to claim 4, wherein a height of said projection is set at a value below 2 millimeters.

17. A structured combustion chamber for an engine, comprising:
    a cylinder head including an intake hole portion which makes a communication between an intake port and a combustion chamber and an exhaust hole portion which makes a communication between an exhaust port and said combustion chamber;
    an intake valve for opening and closing said intake hole portion;
    a continuous variable valve lift mechanism for lifting said intake valve in a stepless fashion; and flow promoting means for promoting a motion of an air current in said combustion chamber when a quantity of lift of said intake valve driven by said continuous variable valve lift mechanism is small and for suppressing a decrease in flow rate of an intake air coming through said intake hole portion into said combustion chamber when the quantity of lift of said intake valve driven by said continuous variable valve lift mechanism reaches a maximum.

* * * * *